April 2, 1968 R. J. ROMAN 3,375,995

SPINDLE ADAPTER

Filed June 24, 1966

ROBERT J. ROMAN
INVENTOR.

BY Robert W Hampton
Steve W. Gremban
ATTORNEYS

United States Patent Office 3,375,995

Patented Apr. 2, 1968

3,375,995

SPINDLE ADAPTER

Robert J. Roman, Rochester, N.Y., assignor to Eastman Kodak Company, Rochester, N.Y., a corporation of New Jersey Filed June 24, 1966, Ser. No. 560,233
6 Claims. (Cl. 242—68.3)

ABSTRACT OF THE DISCLOSURE

A spindle adapter for a spindle adapted to drivingly support a reel having a center opening of one size; the adapter when mounted on the spindle cooperating therewith to drivingly support a reel having a center opening of a larger size.

This invention relates generally to reel supporting spindles, and more specifically to a spindle adapter for converting a spindle capable of drivingly supporting a reel having a center opening of one size to a combined spindle and adapter for drivingly supporting a reel having a center opening of a larger size.

In the motion picture projector art, there are projectors on the market for projecting either regular 8 film, or super 8 film, each film having different perforation sizes and spacing. In order to prevent a customer from attempting to project one type of film on a projector designed to handle the other type, and hence ruining the film, the center openings on the regular 8 and super 8 film reels are made of different sizes so that each reel will only fit on the projector designed to handle it. However, there are times when an adaptable spindle may be required which is capable of accommodating reels having different center opening sizes, as for example, on a combination projector or universal editor which is designed to handle both types of film. The spindle adapter of this invention is particularly adapted for use in connection with apparatus of this latter type.

One of the objects of this invention is to provide an improved spindle adapter that is detachably mountable on a spindle for drivingly supporting a reel having a center opening of a size larger than the size of the spindle defined by its outer periphery.

Another object is to provide a spindle and adapter combination in which the spindle drivingly supports a reel having a center opening of one size, and the combination drivingly supports a reel having a center opening of larger size.

Another object of this invention is to provide an improved spindle adapter that is of simple design and constructure, thoroughly reliable and efficient in operation, and economical to manufacture.

To attain these objects, applicant's invention includes within its scope an adapter that is detachably mountable on a spindle by means of a manually releasable detent. The spindle normally drivingly supports a reel having a center opening of one size, and the adapter, when mounted on the spindle, cooperates therewith to drivingly support a reel having a center opening of a larger size. When not in use, the adapter, by virtue of its detent, may be mounted on a support post for storage.

Objects and advantages other than those set forth above will be apparent from the following description when read in connection with the accompanying drawing, in which.

Figures 2, 3, 4:
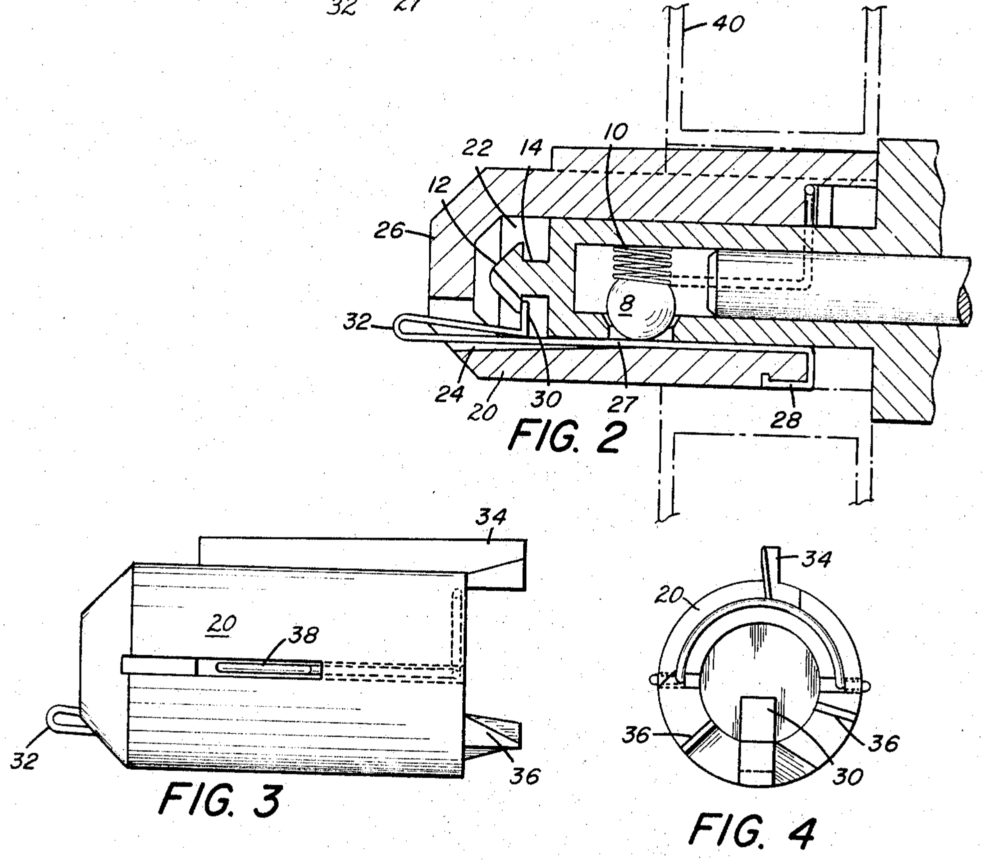
FIG. 2 is a side elevation view in section of the spindle and adapter in a latched position for drivingly supporting a reel having a center opening of a size larger than the one size.
FIG. 3 is a side elevation view of the adapter of FIG. 2.
FIG. 4 is a rear end view of the adapter of FIG. 3.

Referring to the drawings, a spindle 6 is disclosed for rotatably supporting a reel, not shown, having a center opening of a size and configuration just slightly larger than the size of spindle 6 defined by its outer periphery so that the reel may be readily mounted thereon. Although spindle 6 is shown as cylindrical, it can be of any other shape or configuration, such as rectangular. The spindle 6 is rotatably supported by any suitable support member, not shown, and driven by any suitable drive member, not shown, as is well known in the art. The spindle 6 has a detent comprising a ball 8 and spring 10 (see FIG. 2) of known type for releasably holding a reel on spindle 6. The spindle 6 has a cone-shaped end or cam 12 and a peripheral groove 14 for a purpose to be explained hereinafter. An annular surface 16 of spindle 6 forms a backstop for the flange of a reel mounted on spindle 6, and is provided with a drive key 18 for engaging a complementary slot, not shown, in the reel flange as is well known in the art.

Figure 1:
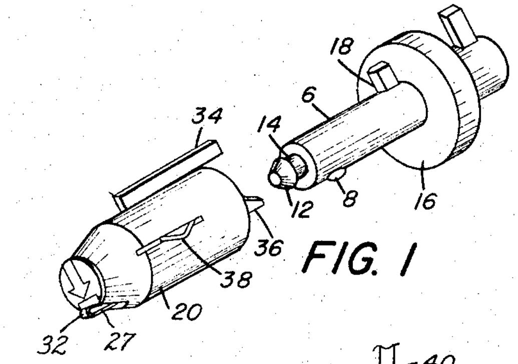
FIG. 1 is a perspective view of a spindle and adapter showing the adapter in a position detached from the spindle, which is capable of drivingly supporting a reel mounted thereon having a center opening of one size.

The spindle adapter 20 comprises a generally cup-shaped housing, in this instance of a cylindrical configuration, having an opening 22 for receiving spindle 6 when adapter 20 is slideably mounted thereon. The adapter 20 has an axially extending slot 24 along the inner periphery of opening 22 that extends through the otherwise closed end 26 of adapter 20. A spring detent 27 is mounted in slot 24 having one end 28 secured to adapter 20 and its other end bent to form a finger 30. When adapter 20 is mounted on spindle 6, spring 27 is initially tensioned by cam 12 as finger 30 rides over it, and then is released to urge finger 30 generally radially inwardly into nesting engagement with the aforementioned groove 14. A portion 32 of spring 27 is bent back upon itself and extends through slot 24 in the otherwise closed end 26 of spindle 6 where it may be manually engaged by the operator and moved generally radially outwardly in the direction of the arrow shown in FIG. 1, against the bias of the spring 27, to disengage spring finger 30 from groove 14 for removing adapter 20 from spindle 6.

In order to drive the adapter 20, it is provided at its rear end with a drive lug 34 and a pair of projections 36, at least one of which is engageable by drive key 18 on spindle 6 when adapter 20 is mounted thereon. The lug 34 and projections 36 are angularly spaced and extend to the rear of adapter 20 equal distances. When adapter 20 is mounted on spindle 6, lug 34 and projections 36 all engage annular surface 16 on spindle 6 for supporting adapter 20 at spaced points surrounding the axis of spindle 6. Interference may exist between the end of key 18 and the end of lug 34 or one of the ends of projections 36 in those situations where the ends are in alignment with one another when the adapter is mounted on the spindle. This is eliminated by tapering the ends of key 18, lug 34 and projections 36 so that they interact to provide full seating of the adapter on spindle 6 in position for driving engagement. The adapter 20 has a reel detent spring 38 of known type for releasably holding a reel 40 thereon.

When adapter 20 is slideably mounted on spindle 6, resilient finger 30 initially engages cam 12 and is cammed radially outwardly tensioning spring 27. When lug 34 and projections 36 on adapter 20 engage annular surface 16, finger 30 is in register with peripheral groove 14 and is forced by the tensioned spring into the groove for releasably holding adapter 20 on spindle 6. To remove the adapter, the spring portion 32 is manually engaged and moved radially outwardly in the direction of the arrow in FIG. 1, withdrawing finger 30 from groove 14.

When the spindle adapter 20 is not being used, it may be stored by mounting it on a support post, not shown, of the same size and configuration as spindle 6, having a cone-shaped end and a peripheral groove.

The invention has been described in detail with particular reference to one embodiment thereof, but it will be understood that variations and modifications can be effected within the spirit and scope of the invention as described hereinabove, and as defined in the appended claims.

I claim:

1. The combination comprising:

a spindle for drivingly supporting a reel having a center opening of one size;

an adapter detachably mountable on said spindle and having an outer periphery for drivingly supporting a reel having a center opening of a size larger than the one size; and a detent on said adapter and engageable with said spindle for releasably holding said member on said spindle.

2. The invention according to claim 1 wherein said spindle has a cam adjacent one end and further defines a recess, and said detent has a resilient projection that is engageable by said cam and cammed radially outwardly into a tensioned condition when said adapter is mounted on said spindle, said projection further being urged by its tensioned condition into said recess when said projection is moved into register therewith.

3. The invention according to claim 1 wherein said spindle has a cone-shaped end terminating in a peripheral recess defined by said spindle, and said detent has a resilient projection that is engageable by said cone-shaped end and cammed radially outwardly into a tensioned condition when said adapter is mounted on said spindle, said projection further being urged by its tensioned condition into said recess when said projection is moved into register therewith.

4. The invention according to claim 1 wherein said spindle is cylindrical and has a cone-shaped end and an annular recess defined by said spindle, and said adapter is cup-shaped having a partially closed end, an inner periphery and an axially extending slot along said inner periphery and extending through said partially closed end, and said detent comprises a spring mounted in said slot and having a normally radially inwardly extending projection that is cammed radially outwardly by said cone-shaped end to place said spring in a tensioned condition when said adapter is mounted on said spindle, said projection further being urged by said tensioned spring into said recess when said projection is moved into register therewith, said spring further having a manually operated portion extending through said slot in said partially closed end of said adapter by which said projection may be withdrawn out of said recess for removal of said adapter from said spindle.

5. A spindle adapter for altering a spindle that normally drivingly supports a reel having a center opening of one size so that it drivingly supports a reel having a center opening of a size larger than the one size, comprising:

a member detachably mountable on the spindle and having an outer periphery for supporting a reel having a center opening of the larger size;

a drive lug on said member cooperating with and drivingly engaging a reel mounted thereon; and a detent on said member and engageable with the spindle for releasably holding said member on the spindle.

6. The combination comprising:

a spindle for drivingly supporting a reel having a center opening of one size;

said spindle having a cone-shaped end and a peripheral recess;

a member detachably mounted on said spindle and having an outer periphery for drivingly supporting a reel having a center opening of a larger size;

said member being cup-shaped and having a partially closed end, an inner periphery, and an axially extending slot along said inner periphery and extending through said partially closed end; and a detent on said member and engageable with said spindle for releasably holding said member on said spindle;

said detent comprising a spring mounted in said slot and having a normally radially inwardly extending projection that is cammed radially outwardly by said cone-shaped end to place said spring in a tensioned condition when said member is moved axially onto said spindle, said projection further being urged by said tensioned spring into said recess when said projection is moved into register therewith, said spring further having a manually operated portion extending through said partially closed end of said member by which said projection may be withdrawn out of said recess to permit removal of said member from said spindle.

References Cited

UNITED STATES PATENTS

| | | | |
|---|---|---|---|
| 1,871,230 | 8/1932 | Foster et al. | 242—68.3 |
| 2,476,928 | 9/1949 | Thomas | 242—71.8 |
| 3,013,741 | 12/1961 | Bittman | 242—82 |
| 2,888,217 | 5/1959 | Zierden | 242—86 |

FOREIGN PATENTS

| | | |
|---|---|---|
| 241,619 | 10/1925 | Great Britain. |

FRANK J. COHEN, *Primary Examiner.*

N. L. MINTZ, *Assistant Examiner.*